United States Patent [19]

Smith

[11] Patent Number: 5,749,621
[45] Date of Patent: May 12, 1998

[54] OPENING ROOF FOR A VEHICLE

[75] Inventor: Robert Smith, Wolverhampton, Great Britain

[73] Assignee: Inalfa Industries B.V., Venray, Netherlands

[21] Appl. No.: 591,724

[22] Filed: Jan. 25, 1996

[30] Foreign Application Priority Data

Jan. 26, 1995 [GB] United Kingdom ............... 9501533
Oct. 25, 1995 [NL] Netherlands ............... 1001499

[51] Int. Cl.$^6$ ............................................. B60J 7/12
[52] U.S. Cl. ..................... 296/219; 296/223; 296/224
[58] Field of Search ........................... 296/219, 216, 296/223, 224

[56] References Cited

U.S. PATENT DOCUMENTS

| | | |
|---|---|---|
| 3,603,636 | 9/1971 | Carella. |
| 3,759,568 | 9/1973 | Unruh ............... 296/98 |
| 5,152,577 | 10/1992 | Omoto et al. ............... 296/219 |
| 5,203,605 | 4/1993 | Grimm et al. ............... 296/219 |
| 5,310,241 | 5/1994 | Omoto et al. ............... 296/219 |

FOREIGN PATENT DOCUMENTS

323593  1/1930  United Kingdom ............... 296/219

*Primary Examiner*—Dennis H. Pedder
*Attorney, Agent, or Firm*—Westman, Champlin & Kelly, P.A.; S. Koehler

[57] ABSTRACT

An opening roof includes a drive motor for driving a connecting device between a front carrier and a frame for sliding the front carrier along guiderails in order to open and close the opening roof. A mounting assembly for the drive motor is so arranged that after the drive motor has moved the front carrier substantially into a forward position through the connecting device and, preferably, a latching device has come into engagement. The drive motor is allowed to move and to transmit its movement through a transmission mechanism to the cover in order to tension the cover.

26 Claims, 8 Drawing Sheets fig 1 fig. 2 fig 3 fig. 4 fig.5 fig. 6 fig 7 fig.8

OPENING ROOF FOR A VEHICLE

BACKGROUND OF THE INVENTION

1. Field of the Invention

This invention relates to an opening roof for a vehicle having an opening in the fixed roof, comprising a frame to be mounted around the opening, a flexible cover for selectively closing or exposing the opening, a front carrier fixed to the front side of the cover and guided at its lateral ends in guide rails extending along two opposite sides of the opening in longitudinal direction of the frame, and latch means for holding the front carrier in a forward position in which the cover closes the opening.

2. Description of the Related Art

In prior art opening roofs it is a problem to close the cover by means of the front carrier such that sufficient tension is applied to the cover in order to obtain a smooth appearance, sufficient stability and a proper seal in the closed position of the opening roof. In a well-known manually operated opening roof the front carrier is provided with a fixed handle which is used to slide the front cover in order to open and close the opening roof. The front carrier also includes a rotatable handle which, upon rotation, actuates a locking mechanism having a latch means in order to bring and hold the front carrier in its forward position. This operation of the opening roof is cumbersome and inconvenient.

SUMMARY OF THE INVENTION

It is an object of the invention to provide an opening roof of the type mentioned in the preamble in which said drawback is removed in an effective way.

For this purpose, the opening roof according to the invention is characterized by drive motor means for driving connection means between the front carrier and the frame for sliding the front carrier along the guiderails in order to open and close the opening roof, and mounting means for the drive motor means which are so arranged that, after the drive motor means has moved the front carrier substantially into the forward position through the connection means and, preferably, the latch means has come into engagement, the drive motor means is allowed to move and to transmit its movement through a transmission mechanism to the cover in order to tension the cover.

In this manner it is possible to use the drive motor means both for driving the front carrier in order to open and close the opening roof and to tension the cover in the closed position of the opening roof. This is accomplished by using the drive motor means in its normal way to drive the connection means and by using this drive motor means in a second way to tension the cover through the transmission mechanism. This transmission mechanism may have such a transmission ratio that a greater force may be applied to the cover than through the connection means which is designed for moving the front carrier with sufficient speed.

The transmission mechanism may engage the front carrier or may engage a slidable rear carrier fixed to the rear end of the cover. In the first embodiment it is possible that the mounting means mounts the drive motor means to the front edge of the frame, the transmission mechanism serving as part of the latch means and being in engagement with the carrier in the forward position of said carrier, or that the mounting means mounts the drive motor means to the front carrier, the transmission mechanism serving as part of the latch means and being in engagement with the frame in the forward position of the carrier.

The mounting means for the drive motor means may be adapted to permit a rotary movement or a translational movement thereof.

The invention will hereinafter be further illustrated with reference to the drawings very schematically showing embodiments of the opening roof according to the invention by way of example.

DESCRIPTION OF THE PREFERRED EMBODIMENTS

Figure 1:
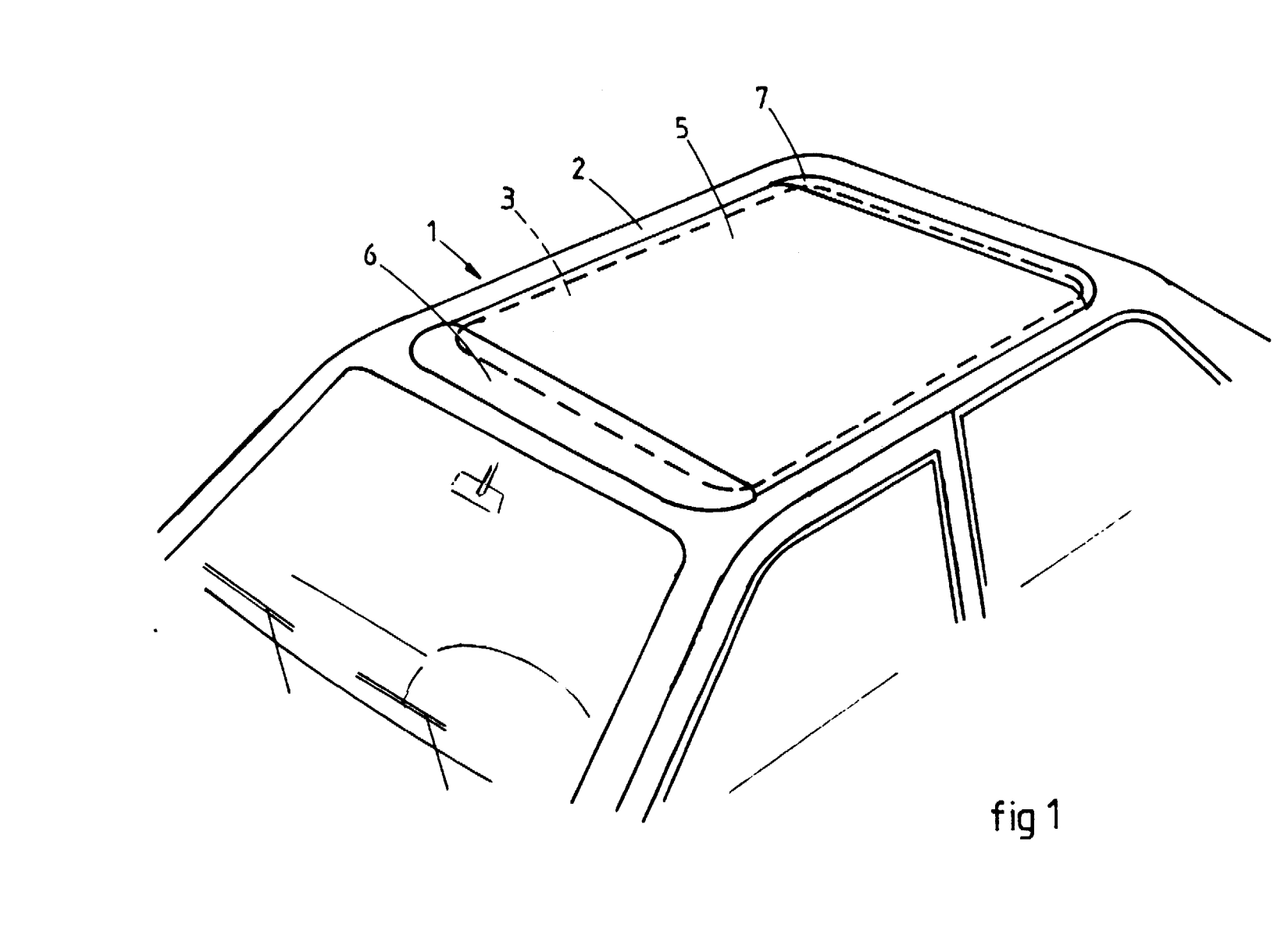
FIG. 1 is a perspective view of the upper part of a car body fitted with an opening roof according to the invention.

Referring to FIG. 1, the body of a motor car 1 has a fixed roof 2 with an opening 3 formed therein. Within the opening 3 an opening roof is mounted for selectively opening and closing the opening 3 in the fixed roof 2 of the motor car 1. The opening roof comprises a stationary frame 4 (FIG. 2) to be mounted to the fixed roof 2 at the circumference of the opening 3. The frame 4 supports a foldable fabric cover 5 having its front edge secured to a front carrier 6 and its rear edge secured to a stationary rear carrier 7. The front carrier 6 has its lateral ends guided within guide rails 8 extending along the opposite side edges of the frame 4 as shown in FIG. 2.

Figure 2:
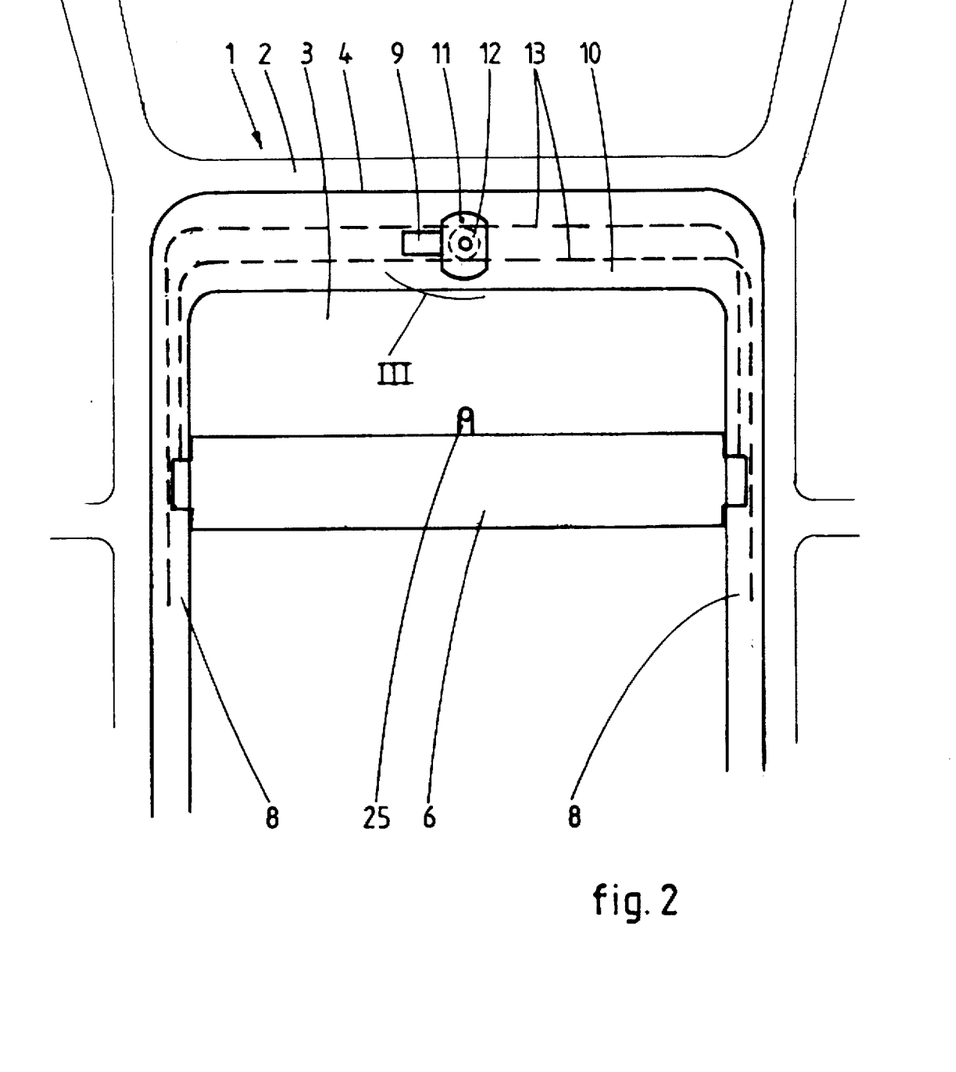
FIG. 2 is a partially broken away plan view of the front part of the opening roof shown in FIG. 1, with the fabric cover removed.

FIG. 2 shows that the opening roof is provided with drive motor means in this case constructed as an electric motor 9 mounted to a transverse front edge 10 of the frame 4 by means of mounting means 11. An output shaft 12 of the electric motor 9 is in engagement with two pull and push cables 13 each fixed with one end to a respective lateral side of the front carrier 6. The cables 13 are guided in the guide rails 8 and are slidable therein by means of the electric motor 9 in order to move the front carrier 6 to and from for opening and closing the cover 5.

Figure 3:
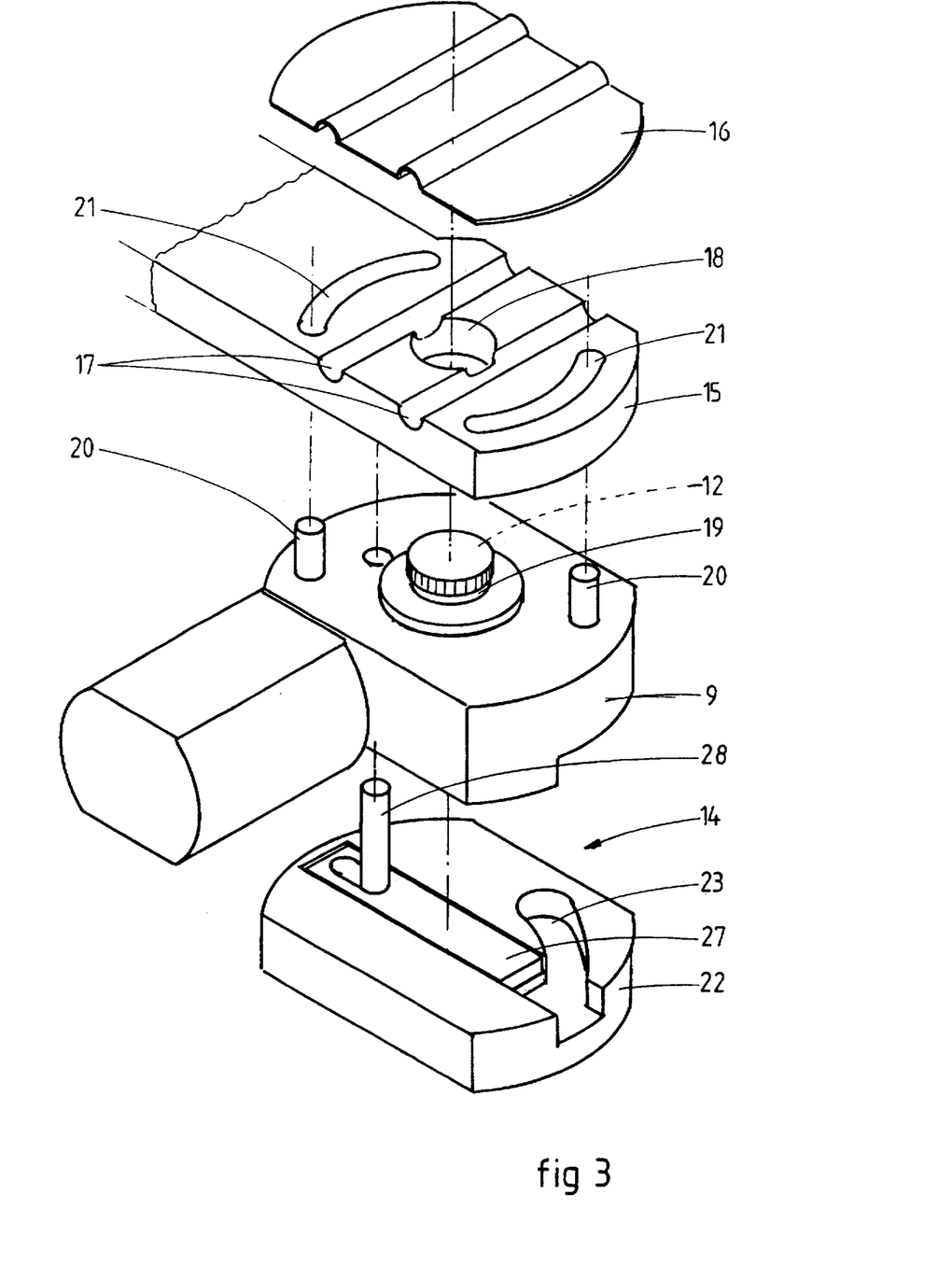
FIG. 3 is a perspective exploded view of detail III in FIG. 2, showing the mounting and drive motor means on a larger scale.
Figure 4:
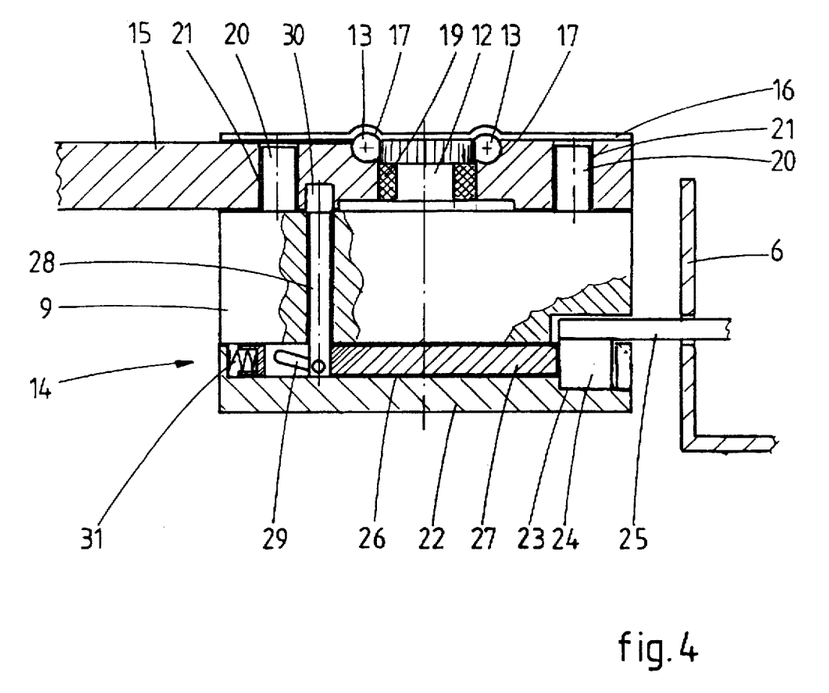
FIG. 4 is a vertical sectional view of the mounting and drive motor means of FIG. 3.

FIG. 3 and 4 show the electric motor 9 and its mounting means 11 together with a transmission mechanism adapted to cooperate with the front carrier 6 in order to tension the fabric cover 5 in the closed position of the opening roof. The mounting means 11 includes a stationary mounting plate 15 secured to a cover plate 16 and attached to the front edge 10 of the frame 4. Plates 15 and 16 together form guide tubes 17 for the drive cables 13. Between the guide tubes 17 a hole is formed for the passage of the output shaft 12 and gear (not shown) for engagement with helical threads of the cables 13. The output shaft 12 is surrounded by a hollow shaft or bearing 19 in order to suspend the housing of the electric motor 9 from the mounting plate 15 such that it is able to rotate around the axis of the output shaft 12. The rotation of the electric motor 9 relative to the mounting plate 15 is guided and limited by means of dowels 20 fixed to the upper side of the motor 9 and engaging in semi-circular slots 21 formed in the mounting plate 15 and having their center coincide with the axis of the output shaft 12. The angle of rotation may for example be limited to circa 90°.

Attached to the lower side of the electric motor 9 is the transmission mechanism 14 here constructed as a cam plate 22. The cam plate 22 forms a unit with the electric motor 9 and is non-rotatably fixed thereto but leaving a spacing therebetween. The cam plate 22 includes a cam track 23 in the form of a slot opening to the outer circumference of the cam plate 22 on one end and being closed on the other end. The cam track 23 has a helical shape with the closed end thereof lying further away from the circular circumference of the cam plate 22 and being positioned closer to the axis of rotation of the cam plate 22 than the open end.

The cam track 23 is adapted to cooperate with a cam 24 at the forward end of a latch 25 projecting a forward direction from the front wall of the front carrier 6. The cam 24 of the latch 25 can be a roller bearing on a spindle suspended from the front end of the latch 25, the height of the latch 25 being such that it is able to enter the spacing between the cam plate 22 and the electric motor 9 when the cam 24 is in engagement with the cam track 23 of the cam plate 22.

The cam plate 22 also includes a radial straight slot 26 accomodating a slide 27. The slot 26 opens on one end into the open end of the cam track 23 which is directed radially. In the normal operating position of the electric motor 9, the slot 26 is directed parallel to the direction of movement of the front carrier 6 of the opening roof and the rear end of the slide 27 in the slot 26 being positioned near the circumference of the cam plate 22. The front end of the slide 27 is in engagement with the lower end of a vertical locking pin 28 through a height adjusting means 29 so as to adjust the locking pin 28 between an upper position in which it engages a locking recess 30 in the bottom of the mounting plate 15, and a lower position in which the locking pin 28 is outside the locking recess 30. A spring 31 is biassing the slide 27 in rearward direction to a position in which the locking pin 28 is in engagement with the locking recess 30.

The operation of the drive motor means for the opening roof shown in FIGS. 3 and 4 is as follows.

In the open position of the opening roof in which the front carrier 6 is moved partially or fully from its forward position a rearward direction, the electric motor 9 drives the front carrier 6 through the cables 13 which are driven by a gear on the output shaft 12 of the electric motor 9. The housing of the electric motor 9 is locked in its position relative to the mounting plate 15 by means of the locking pin 28. When the opening roof should be closed completely, the electric motor is energized and the front carrier 6 is moved to its forward position by means of the drive cables 13. When the front carrier 6 nearly reaches its forward position, the cam 24 of the latch 25 meets the front end of the slide, 27 in the cam plate 22. Upon further forward movement of the front carrier 6, the cam 24 displaces the slide 27 which in turn pulls the locking pin 28 in a downward direction which then leaves the locking recess 30 in the mounting plate 15 allowing the housing of the electric motor 9 to rotate around the axis of the output shaft 12. The housing of the electric motor 9 will start to rotate when the resistance of the cables 13 caused by the tension force of the cover 5 exerted on the front carrier 6 exceeds the resistance to rotation of the electric motor 9. When the motor 9 is rotating, the cam 24 of the latch 25 of the front carrier 6 is entering the helical part of the cam track 23 and, as a result, is urged to move forward thereby moving the front carrier 6 further forward and tensioning the cover 5 which is fixed to the front carrier 6. The transmission ratio of the transmission mechanism 14 is determined by the shape of the cam track 23 and will be adapted to the power of the electric motor 9 and the required tension on the cover 5. The transmission ratio will be chosen such that a much greater force can be exerted on the front carrier by the transmission mechanism than by the drive cables. The rotation of the electric motor 9 will stop as soon as the cover 5 is tensioned to a sufficient extent (corresponding to a predetermined torque level of the electric motor) or when the cam 24 has reached the closed end of the cam track 23. In this fully closed position of the opening roof, the slide 27 will remain in its biased unlocking position, for example by the locking pin 28 which is prevented from moving up due to its engagement with the lower side of the mounting plate 15.

For opening the opening roof, the electric motor 9 is driven in opposite direction. In that case the cables 13 cannot be moved since the front carrier 6 is locked through the latch 25. The housing of the electric motor 9 will therefore rotate around its output shaft 12 and will therefore urge the cam 24 back thereby releasing the front carrier 6 which will be pulled back by the cover 5 and pushed back by the latch 25. When the cam 24 has reached the entrance/exit of the cam track 23, the locking pin 28 has arrived below the locking recess 30 and when the cam 24 of the latch 25 of the front carrier 6 leaves the cam plate 22, the spring 31 will push the slide 27 in the direction of travel of the front carrier 6 thereby urging the locking pin 28 into the locking recess 30 in the mounting plate 15. The electric motor 9 will now move the front carrier 6 further rearward through the cables 13 with a higher speed.

Figure 5:
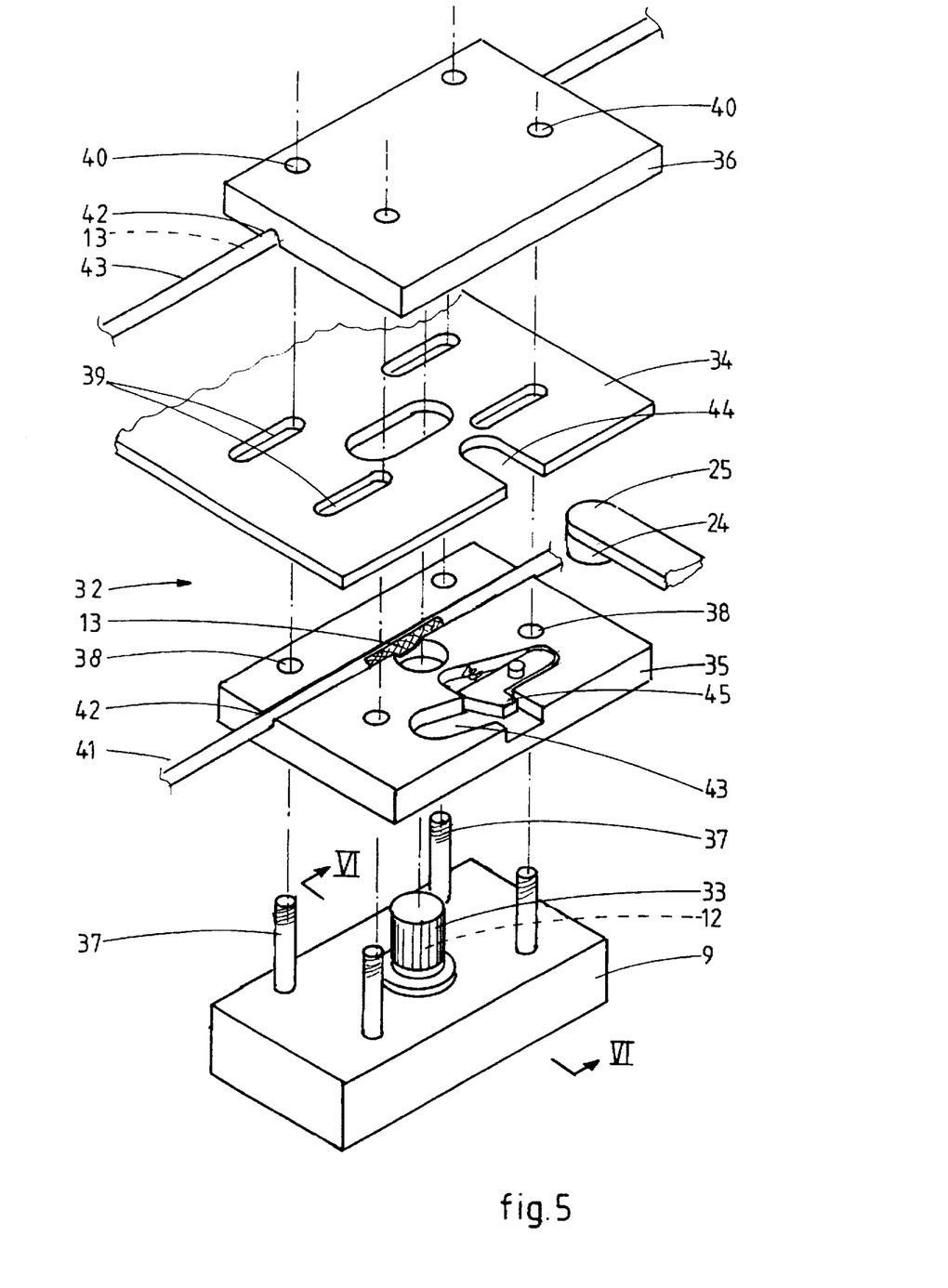
FIG. 5 is a view corresponding to that of FIG. 3 but showing an alternative embodiment for the mounting and drive motor means.
Figure 6:
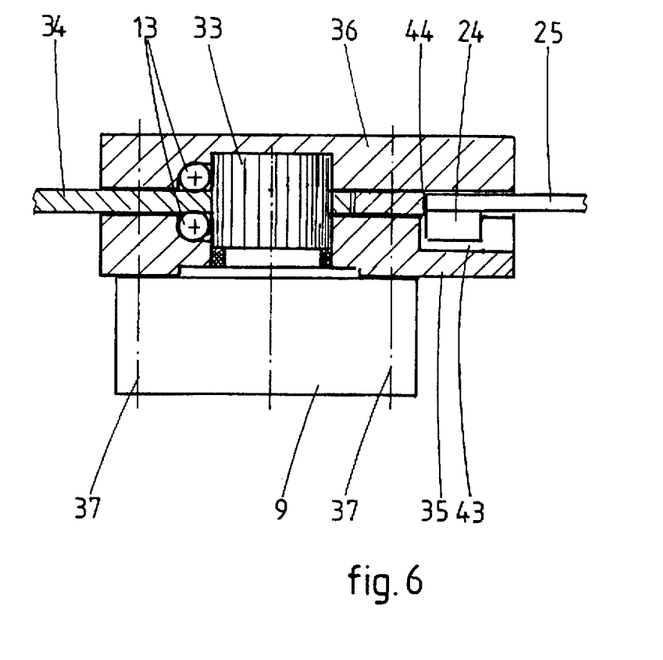
FIG. 6 is a sectional view along the lines VI-VI in FIG. 5.

FIGS. 5 and 6 show an alternative embodiment of the mounting and drive motor means. FIG. 5 again shows the electric motor 9, the front edge 10 of the frame 4, the output shaft 12 of the electric motor 9 and the latch 25 of the front carrier 6.

In this embodiment, the mounting means 32 is arranged to permit a translatory movement of the electric motor 9 instead of a rotary movement. In order to cause a reaction force on the electric motor 9 resulting in a translational movement of the electric motor 9, both drive cables 13 are now positioned on one side of two separate pinions 33 on the output shaft 12 and are therefore driven in the same direction, contrary to the first embodiment where the reaction force on the output shaft 12 has to cause a rotary movement of the motor 9.

The mounting means 32 includes a stationary central plate 34 fixed to the front edge 10 of the frame 4, a bottom block 35 and a top block 36. The electric motor 9 is secured to the bottom block 35 by three tap bolts 37 or the like which pass through holes 38 in the bottom block 35, through parallel slots 39 in the central plate 34 and through holes 40 in the top block 36 where they are fixed using lock nuts so that the blocks 35 and 36 are mounted onto the central plate 34 but not clamped. By this arrangement, the motor 9 together with the blocks 35 and 36 may move relative to the central plate 34, said movement being guided by the engagement of the tap bolts 37 in the slots 39 and by stationary cable tubes 41 which are slidably guided in channels 42 in the top and bottom blocks 35 and 36, respectively. The bottom block 35 (and/or the top block 36) is provided with a forwardly inclined cam track 43 for cooperation with the cam 24 of the latch 25 of the front carrier 6 so as to move the cam 24 and latch 25 forward or backward when the motor 9 and blocks 35, 36 are moved sideways. Adjacent the entrance of the cam track 43 in the bottom block 35 or adjacent a recess 44 in the central plate, a locking mechanism 45 is provided, locking the block 35 relative to the central plate 34 thereby preventing movements of the motor 9 when the front carrier is not in or near its forward position. The locking mechanism 45 includes a spring loaded movable element protruding into said slot entrance or recess in order to cooperate with the latch 25 for unlocking the lock.

The operation of this embodiment is similar to that of the embodiment of FIGS. 2–4, the main difference being that the movement of the electric motor 9 is linear instead of circular.

Figure 7:
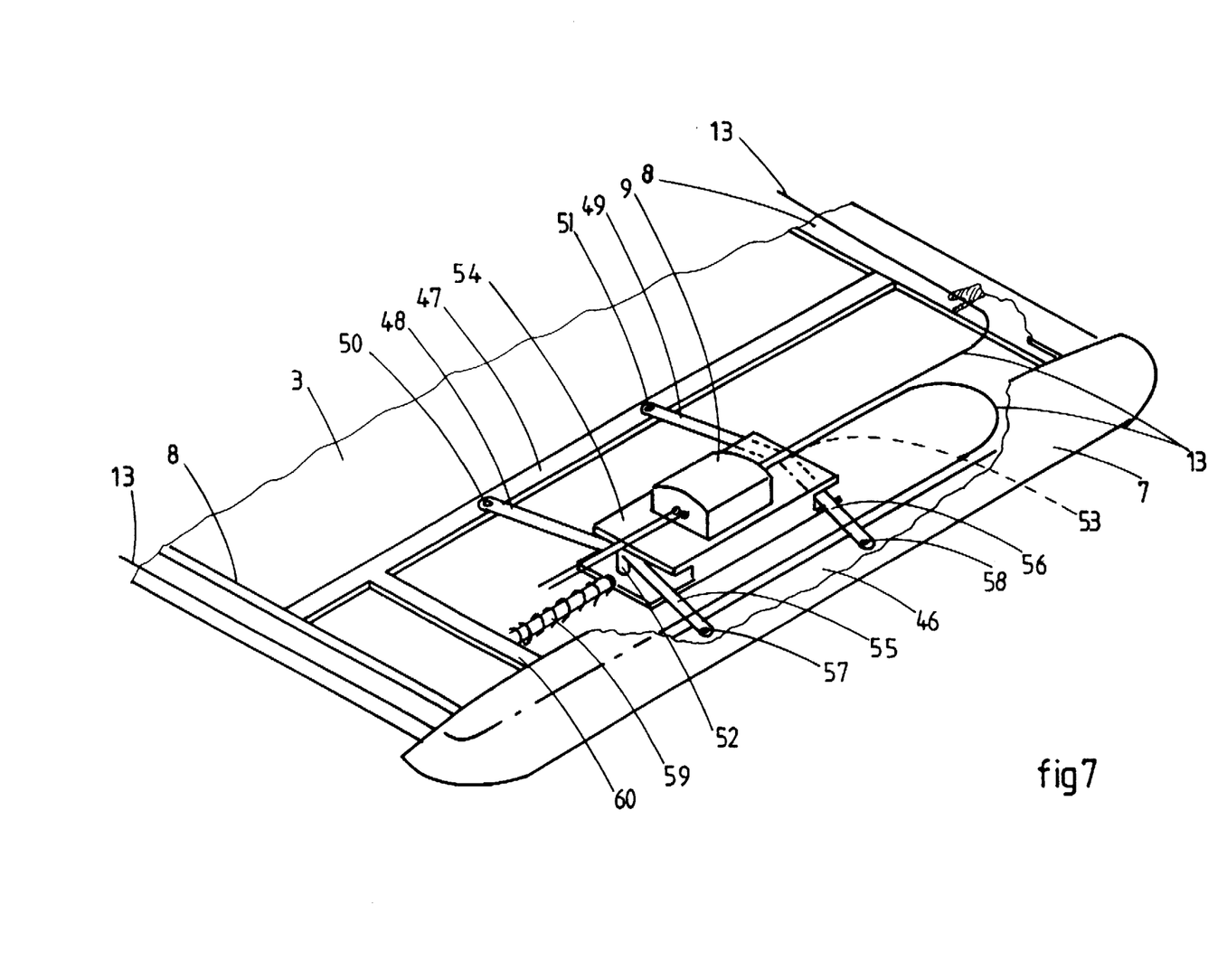
FIG. 7 is a partially broken away schematic perspective view of the rear part of still another embodiment of the opening roof according to the invention, with the fabric cover removed.
Figure 8:
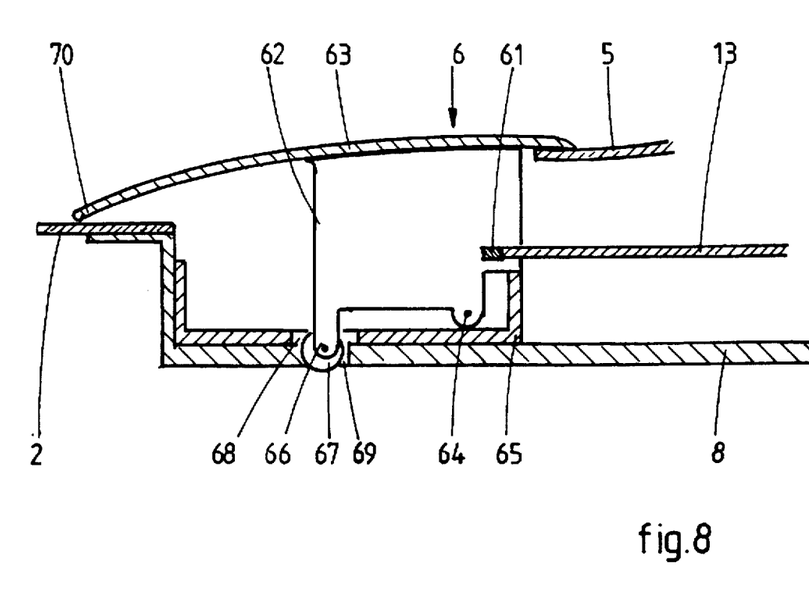
FIG. 8 is a transverse sectional view showing the front carrier and cover plate of the roof of FIG. 7 in its engaged position.

Referring to FIGS. 7 and 8, a third embodiment is shown of the mounting and drive motor means which, in this case, cooperates with the rear carrier 7, which is now slidable in a longitudinal direction.

A short distance in front of a rear edge 46 of the frame 4, the guide rails 8 are connected by a transverse member 47 below the level of the fabric cover 5. Each of a pair of links 48, 49 has one end connected by a respective pivot pin 50, 51 to the transverse member 47. The other ends of the links 48 and 49 are coupled by respective pivot pins 52 and 53 to a motor mounting plate 54. Each of a second pair of links 55 and 56 has one end mounted on the pivot pins 52 and 53 respectively and the other end coupled by respective pivot pins 57 and 58 to the rear carrier 7. Thus the lateral movement of the motor mounting plate 54 causes longitudinal movement of the rear carrier 7 relative to the transverse member 47. The motor mounting plate 54 is biased to the right by a compression spring 59 which engages with a strut 60 extending between the transverse member 47 and the rear edge of the opening 3 in the vehicle roof 2.

The electric motor 9 is mounted on the motor mounting plate 54 and arranged to cause simultaneous longitudinal movement of two drive cables 13 which extend along the respective guide rails 8. A respective tube (not shown) for each cable 13 which extends between the motor 9 and the corresponding guide rail 8 to ensure that movement of each cable 13 at the motor 9 causes identical movement along the guide rails 8.

As shown in FIG. 8, the front end of each cable 13 is secured, at connection 61, to a flange 62 which is formed integrally with a front cover plate 63 of the front carrier 6 and projects downwardly therefrom. The rear bottom corner of flange 62 is connected by a pivot pin 64 to a transverse channel member 65 which has its ends supported in the guide rails 8.

The front bottom corner of the flange 62 has a downwardly extended projection 66 with a roller 67 journaled thereon. When the fabric cover 5 is in its fully closed position, as illustrated in FIG. 8, the projection 66 extends through a slot 68 in the bottom of the channel member 65 so that the roller 67 engages in a slot 69 in the bottom of the guide rail 8 so as to prevent rearward movement of the channel member 65 and the front cover plate 63 mounted thereon. This arrangement therefore not only serves to move the front cover plate downwardly in the closed position of the roof in order to seal the cover 5 and cover plate to the fixed roof but also serves as a latch for the front carrier 6.

When the roof is being closed and the front carrier 6 has reached its forward position in which it is locked by the latch, a further forward movement of both drive cables 13 is blocked but the motor 9 continues to attempt to drive the cables to the right, as viewed in FIG. 7. The resulting reaction on the motor mounting plate 54 compresses the spring 59, allowing the links 48 and 55 and the links 49 and 56 to come almost into alignment with one another. This moves the rear carrier 7 rearwardly so as to tension the folding fabric cover 5. The tension exerted by the compression spring 59 is chosen to be sufficient to overcome the maximum blocking force which could be exerted on the cables 13 by obstructions such as debris in the guide rails 8 and manufacturing imperfections. This ensures that the motor mounting plate is not displaced to the left, as viewed in FIG. 7, until the channel member 65 is at the forward end of the guide rails 8 and the front edge 70 of the front cover plate 63 in contact with the vehicle roof 2, as shown in FIG. 8.

When the folding fabric cover 5 is to be opened, the motor 9 is energized to drive the cables 13 in the opposite direction. Initially, the spring 59 displaces the motor mounting plate back. Next, the drive cables 13 cause the flange 62 to pivot about the pivot pin in a clockwise direction, lifting the front edge 70 of the front cover plate clear of the vehicle roof 2 while raising the roller 67 out of the slot 69 in the guide rail 8. Only then can the cables 13 pull the channel member 65 and, with it, the front cover plate 63 rearwardly in order to move the folding fabric cover 5 toward its open position. It is prevented therefore that a rearward movement of the front cover plate 63 cannot start until its front edge 70 is clear of the vehicle roof 2.

The invention is not restricted to the embodiments shown in the drawing and described herein before which may be varied in different manners within the scope of the invention. It is for example possible that, instead of the housing of the electric motor being movable, the electric motor being provided with two movable parts, e.g. two rotatable output shafts, one of which being engaged with the connection means and the other with the transmission mechanism. There should be provided a mechanism ensuring that only one shaft is driven at a time. In case the electric motor is mounted to the front carrier, then the connection means may consist of a transverse shaft provided on both ends with a pinion which is in engagement with a gear rack extending along the guide rails. The embodiment of the mounting and drive motor means engaging the rear carrier may also have a locking arrangement for the electric motor, which is for example unlocked by a releasing member fixed to the drive cable or other connection means. The opening roof may also be constructed such that a rear carrier or side carrier is moved to open and close the cover fixed to the carrier. A combination is conceivable as well.

I claim:

1. An opening roof for a vehicle having an opening in a fixed roof comprising:

a frame to be mounted around the opening;

a flexible cover for selectively closing or exposing the opening;

a front carrier fixed to the front side of the cover and guided at its lateral ends in guide rails extending along two opposite sides of the opening in longitudinal direction of the frame;

latch means for holding the front carrier in a forward position in which the cover closes the opening;

drive motor means for driving connection means between the front carrier and the frame for sliding the front carrier along the guide rails in order to open and close the opening roof; and mounting means for the drive motor means which is so arranged that, after the drive motor means has moved the front carrier substantially into the forward position through the connection means, the drive motor means is allowed to move and to transmit their movement through a transmission mechanism to the cover in order to tension the cover.

2. The opening roof according to claim 1, wherein the transmission mechanism transmits the movement to the front carrier.

3. The opening roof according to claim 2, wherein the mounting means mounts the drive motor means to the front edge of the frame, the transmission mechanism cooperating with the latch means and being in engagement through the latch means with the carrier in the forward position of said carrier.

4. The opening roof according to claim 1, wherein the mounting means mounts the drive motor means to the rear edge of the frame, the transmission mechanism engaging a rear carrier fixed to the rear edge of the cover of the opening roof and being slidable i longitudinal direction of the opening roof, the drive motor means being movable when the latch means has locked the front carrier.

5. The opening roof according to claim 1, wherein spring means acts with a spring force on the drive motor means in a direction opposite a direction of movement of the drive motor means for tensioning the cover.

6. The opening roof according to claim 5, wherein the spring force prevents a movement of the drive motor means in open positions of the opening roof.

7. The opening roof according to claim 1, wherein a locking means acts on the drive motor means for preventing the drive motor means from moving in the open positions of the opening roof.

8. The opening roof according to claim 7, wherein the locking means is releasable when the front carrier reaches its forward position by means of a releasing member connected to the front carrier.

9. The opening roof according to claim 1, wherein the mounting means is arranged for permitting a rotary movement of the drive motor means.

10. The opening roof according to claim 1, wherein the mounting means is arranged for permitting a translational movement of the drive motor means.

11. The opening roof according to claim 1, wherein the transmission mechanism includes a cam plate connected to the drive motor means and a cam connected to the carrier.

12. The opening roof according to claim 10, wherein the transmission mechanism includes a linkage mechanism.

13. The opening roof according claim 1, comprising stops for limiting the movement of the drive motor means.

14. The opening roof according to claim 1, wherein the connection means are provided with pull and push cables which are slidable within the guide rails by means of the drive motor means and which are attached to the front carrier.

15. An opening roof for a vehicle having an opening in a fixed roof, comprising:

a frame to be mounted around the opening and including guide rails extending along two opposite sides of the opening;

a flexible substantially rectangular cover for selectively closing or exposing the opening;

a carrier fixed to one side of the cover and guided at its lateral ends in the guide rails;

latch means for holding the carrier in a position in which the cover closes the opening;

connection means between the carrier and the frame for sliding the carrier along the guide rails in order to open and close the opening roof;

drive motor means having an output shaft engaging the connection means in order to drive it;

mounting means for the drive motor means which are so arranged that, after the drive motor means has moved the carrier substantially into the closed position through the connection means, wherein a housing of the drive motor means is allowed to move; and a transmission mechanism interconnecting the housing of the drive motor means and the cover in order to tension the cover with a greater force than can be exerted by the connection means.

16. An opening roof for a vehicle having an opening in a fixed roof, comprising:

a frame to be mounted around the opening;

a flexible cover for selectively closing or exposing the opening;

a front carrier fixed to the front side of the cover and guided at its lateral ends in guide rails extending along two opposite sides of the opening in longitudinal direction of the frame;

latch means for holding the front carrier in a forward position in which the cover closes the opening;

drive motor means for driving connection means between the front carrier and the frame for sliding the front carrier along the guide rails in order to open and close the opening roof; and mounting means for the drive motor means which are so arranged that, after the drive motor means has moved the front carrier substantially into the forward position through the connection means and the latch means has come into engagement, the drive motor means are allowed to move and to transmit their movement through a transmission mechanism to the cover in order to tension the cover.

17. An opening roof for a vehicle having an opening in a fixed roof, comprising:

a frame to be mounted around the opening, the frame having guide rails along two opposite sides;

a flexible cover guided in the guide rails to a forward position to close the opening;

a drive motor for driving the cover along the guide rails in order to open and close the opening; and a mount for the drive motor, the mount allowing movement of the drive motor in order to tension the cover, after the drive motor has moved the cover to the forward position.

18. The opening roof according to claim 17 and further comprising a latch for holding the cover in the forward position.

19. The opening roof of claim 17 wherein the mount allows translational movement of the drive motor.

20. The opening roof of claim 17 wherein the mount allows rotational movement of the drive motor.

21. The opening roof according to claim 17 and further comprising a spring operably coupled to the drive motor to provide a spring force on the drive motor in a direction opposite a direction of movement of the drive motor for tensioning the cover.

22. The opening roof according to claim 21, wherein the spring force prevents a movement of the drive motor in open positions of the opening roof.

23. A method of closing an opening in a vehicle roof, the vehicle having a frame mounted around an opening in the roof with guide rails on opposite sides of the opening, a flexible cover guided in the guide rails for selectively covering the opening, and a drive motor coupled to the cover selectively displacing the cover, the method comprising the steps of:

operating the drive motor to move the cover to a substantially closed position; and     moving the drive motor to tension the cover from the substantially closed position.

24. The method of claim 23 wherein the step of moving comprises translational movement of the drive motor.

25. The method of claim 23 wherein the step of moving comprises rotational movement of the drive motor.

26. The apparatus of claim 17, and further comprising connection means for connecting the drive motor to the cover and to displace the cover to and from the forward position, and wherein the mount includes a transmission mechanism in order to tension the cover with a greater force than can be exerted by the connection means.

\* \* \* \* \*

UNITED STATES PATENT AND TRADEMARK OFFICE
CERTIFICATE OF CORRECTION

PATENT NO. : 5,749,621
DATED : May 12, 1998
INVENTOR(S) : Smith

It is certified that error appears in the above-identified patent and that said Letters Patent is hereby corrected as shown below:

```
Column 6, line 56, after "roof" insert --,--.
Column 7, line 23, replace "i" with --in--.
```

Signed and Sealed this

Ninth Day of March, 1999

Attest:

Q. TODD DICKINSON

Attesting Officer     Acting Commissioner of Patents and Trademarks